US012730636B2

(12) United States Patent
Nguyen et al.

(10) Patent No.: US 12,730,636 B2
(45) Date of Patent: Sep. 8, 2026

(54) SYSTEMS AND METHODS OF PROGRAMMING FOR IN-MEMORY PROCESSING

(71) Applicant: Samsung Electronics Co., Ltd., Suwon-si (KR)

(72) Inventors: Marie Mai Nguyen, Pittsburgh, PA (US); Tong Zhang, Mountain View, CA (US); Yangwook Kang, San Jose, CA (US); Rekha Pitchumani, Oak Hill, VA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 19/038,676

(22) Filed: Jan. 27, 2025

(65) Prior Publication Data

US 2026/0003617 A1 Jan. 1, 2026

Related U.S. Application Data

(60) Provisional application No. 63/688,814, filed on Aug. 29, 2024, provisional application No. 63/666,105, filed on Jun. 28, 2024.

(51) Int. Cl.
*G06F 9/30* (2018.01)
*G06F 9/54* (2006.01)

(52) U.S. Cl.
CPC ...... *G06F 9/30043* (2013.01); *G06F 9/30189* (2013.01); *G06F 9/544* (2013.01)

(58) Field of Classification Search
CPC .. G06F 9/30043; G06F 9/30189; G06F 9/544; G06F 8/41; G06F 15/7821;
(Continued)

(56) References Cited

U.S. PATENT DOCUMENTS 8,234,460 B2 7/2012 Walker
8,335,908 B2 12/2012 Waugh
(Continued)

FOREIGN PATENT DOCUMENTS

IN 202244051173 4/2023
JP 2019531546 A 10/2019
(Continued)

OTHER PUBLICATIONS

Samsung, "HBM-PIM: Cutting-Edge Memory Technology to Accelerate Next-Generation AI," Tech Blog, Mar. 2023, 3 pages.
(Continued)

*Primary Examiner* — Farley Abad
(74) *Attorney, Agent, or Firm* — Renaissance IP Law Group LLP

(57) ABSTRACT

Provided are systems, methods, and apparatuses for systems and methods of programming processes in processing in memory (PIM) systems. In one or more examples, the systems, devices, and methods include enabling, via a processor, a PIM manager for processing of PIM instructions, the PIM manager being located on a base die of a stacked memory module; enabling, via the PIM manager, a plurality of processing units of one or more memory dies of the stacked memory module for processing; compiling source code comprising the PIM instructions into machine code; loading, via PIM manager, the machine code into an allocation of memory of the stacked memory module; and executing, via the plurality of processing units, the PIM instructions based on loading the machine code into the memory of the stacked memory module.

20 Claims, 7 Drawing Sheets

600

Enable a PIM manager for processing PIM instructions
605

Enable processing units of memory dies on the stacked memory module for processing
610

Compile source code comprising the PIM instructions into machine code
615

Load the machine code into an allocation of memory of the stacked memory module
620

Execute the PIM instructions based on loading the machine code into the memory of the stacked memory module
625

(58) Field of Classification Search
CPC ...... G06F 8/451; G06F 3/0604; G06F 3/0658; G06F 3/0659; G06F 8/51; G06F 9/3004
See application file for complete search history.

(56) References Cited

U.S. PATENT DOCUMENTS 9,870,339 B2 1/2018 Kang et al.
10,467,159 B2 11/2019 Beard et al.
10,474,600 B2 11/2019 Malladi et al.
10,592,121 B2 3/2020 Malladi et al.
10,866,900 B2 12/2020 Chang et al.
11,036,660 B2 6/2021 Ooi et al.
11,093,277 B2 8/2021 Sankaran et al.
11,158,357 B2 10/2021 Yu et al.
11,276,459 B2 3/2022 O
11,468,001 B1 10/2022 Hassaan et al.
11,625,245 B2 4/2023 Nurvitadhi et al.
11,645,197 B2 5/2023 Seo
11,748,077 B2 9/2023 Wang et al.
11,860,800 B2 1/2024 Wang et al.
11,861,758 B2 1/2024 Agostini
11,880,590 B2 1/2024 Jeong et al.
11,921,634 B2 3/2024 Kotra et al.
12,038,819 B2 7/2024 Patle et al.
12,058,874 B1 8/2024 Farjadrad
12,087,388 B2 9/2024 Yu et al.
12,099,455 B2 9/2024 Yu et al.
12,182,409 B2 12/2024 Kang et al.
12,182,532 B1 12/2024 Kim
12,190,038 B1 1/2025 Farjadrad
2006/0248280 A1 11/2006 Al-Sukhni et al.
2009/0300292 A1 12/2009 Fang et al.
2010/0078790 A1 4/2010 Ito et al.
2014/0043333 A1* 2/2014 Narayanan .............. G06T 15/80 345/426
2014/0181427 A1 6/2014 Jayasena et al.
2014/0195744 A1* 7/2014 Fleischer ............ G06F 13/1663 711/151
2016/0026912 A1 1/2016 Falcon et al.
2017/0060588 A1* 3/2017 Choi ...................... G06F 15/80
2017/0255390 A1 9/2017 Chang et al.
2017/0344301 A1 11/2017 Ryu et al.
2018/0096735 A1 4/2018 Pappu
2018/0364944 A1 12/2018 Grossman et al.
2019/0042240 A1 2/2019 Pappu et al.
2019/0050325 A1 2/2019 Malladi et al.
2019/0096453 A1 3/2019 Shin et al.
2019/0138569 A1 5/2019 Korthikanti et al.
2019/0303033 A1 10/2019 Noguera Serra et al.
2020/0004690 A1 1/2020 Mathew et al.
2020/0081651 A1* 3/2020 Aga ...................... G06F 3/0679
2020/0081744 A1 3/2020 Siegl et al.
2020/0097417 A1 3/2020 Malladi et al.
2020/0119736 A1 4/2020 Weber et al.
2020/0184001 A1 6/2020 Gu et al.
2020/0294558 A1 9/2020 Yu et al.
2021/0019076 A1 1/2021 Kim et al.
2021/0110876 A1 4/2021 Seo et al.
2021/0173893 A1 6/2021 Luo
2021/0200696 A1 7/2021 Kang et al.
2021/0303346 A1 9/2021 Shahim et al.
2021/0354729 A1 11/2021 Ng et al.
2021/0374607 A1* 12/2021 Kazakov ............. G06F 13/1668
2022/0036929 A1 2/2022 Yu et al.
2022/0068366 A1 3/2022 Kwon et al.
2022/0075564 A1 3/2022 Moon et al.
2022/0188606 A1 6/2022 Roberts
2022/0197656 A1 6/2022 Heirman et al.
2022/0206685 A1 6/2022 Kalamatianos et al.
2022/0206817 A1 6/2022 Kotra et al.
2022/0206869 A1 6/2022 Ramachandran et al.
2022/0222198 A1 7/2022 Lanka et al.
2022/0269436 A1 8/2022 Kellam et al.
2022/0342595 A1 10/2022 Chatterjee et al.
2022/0414013 A1 12/2022 Alsop et al.
2023/0026505 A1 1/2023 Lee et al.
2023/0051544 A1 2/2023 Vanesko et al.
2023/0053439 A1 2/2023 Hornung et al.
2023/0094148 A1 3/2023 Lee et al.
2023/0109990 A1 4/2023 Pappu et al.
2023/0128183 A1 4/2023 Kang et al.
2023/0138048 A1 5/2023 Kwon et al.
2023/0195375 A1 6/2023 Puthoor et al.
2023/0195459 A1 6/2023 Puthoor et al.
2023/0195645 A1 6/2023 Puthoor et al.
2023/0205693 A1 6/2023 Kotra et al.
2023/0260075 A1 8/2023 Maiyuran et al.
2023/0289294 A1 9/2023 Swaine
2023/0305978 A1 9/2023 Davis et al.
2023/0315651 A1 10/2023 Dally et al.
2023/0316043 A1 10/2023 Darvish Rouhani et al.
2023/0334613 A1 10/2023 Daxer et al.
2023/0343718 A1 10/2023 Zhou et al.
2023/0393849 A1 12/2023 Kotra et al.
2024/0004585 A1 1/2024 Ibrahim et al.
2024/0004653 A1 1/2024 Alsop et al.
2024/0013338 A1 1/2024 Matam et al.
2024/0036951 A1 2/2024 Long et al.
2024/0047364 A1 2/2024 Blair
2024/0063200 A1 2/2024 Niu et al.
2024/0078195 A1 3/2024 Madan et al.
2024/0103745 A1 3/2024 Madan et al.
2024/0161227 A1 5/2024 Appu et al.
2024/0168639 A1 5/2024 Aga et al.
2024/0205805 A1 6/2024 Boccuzzi et al.
2024/0403254 A1 12/2024 Ma et al.
2025/0021378 A1 1/2025 Liu et al.
2025/0031385 A1 1/2025 Agarwal et al.
2025/0036579 A1 1/2025 Chang et al.
2025/0045102 A1 2/2025 Liu et al.
2025/0053322 A1 2/2025 Lee et al.
2025/0077457 A1 3/2025 Jin et al.
2025/0085875 A1 3/2025 Litt et al.
2025/0190391 A1 6/2025 Jeong
2026/0003617 A1 1/2026 Nguyen et al.

FOREIGN PATENT DOCUMENTS

KR 20200108768 A 9/2020
KR 102430982 A 8/2022
KR 20240104054 7/2024
WO 2021028723 A2 2/2021
WO 2024137416 A1 6/2024

OTHER PUBLICATIONS

Thiruvengadam, Vijay, "Memory Processing Units (MPU)," The University of Wisconsin, Madison (Reference in WebArchive—Wayback Machine), Apr. 2024, 60 pages.
Xie, Xinfeng et al., "MPU: Memory-Centric SIMT Processor via In-DRAM Near-Bank Computing," ACM Transactions on Architecture and Code Optimization, vol. 20, No. 3, Jul. 2023, 26 pages.
Xie, Xinfeng et al., "MPU: Towards Bandwidth-Abundant SIMT Processor via Near-Bank Computing," arXiv, Mar. 2021, pp. 1-13.
Aspen Systems Inc., "Intel® Gaudi® 3 Accelerator", https://www.aspsys.com/intel-gaudi-3-accelerators, 2025, 3 pages.
Aspen Systems Inc., "Processors", 2025, https://www.aspsys.com/category/hpc-processors/, 2025, 2 pages.
Cai, Weilin et al., "A Survey on Mixture of Experts," arXiv:2407.06204, Jun. 2024, 41 pages.
Choi, Jungwoo et al., "A Lightweight and Efficient GPU for NDP Utilizing Data Access Pattern of Image Processing," IEEE Transactions on Computers, vol. 70, No. 1, Jan. 2022, pp. 13-26.
Cui, Weihao et al., "Optimizing Dynamic Neural Networks with Brainstorm," 17th USENIX Symposium on Operating Systems Design and Implementation, Jul. 2023, 21 pages.
Eliseev, Artyom et al., "Fast Inference of Mixture-of-Experts Language Models with Offloading," arXiv:2312.17238, Dec. 2023, 12 pages.
European Extended Search Report for Application No. 25184706.7, mailed Oct. 27, 2025.

(56) References Cited

OTHER PUBLICATIONS

European Extended Search Report for Application No. 25184833.9, mailed Nov. 3, 2025.

European Extended Search Report for Application No. 25185257.0, mailed Dec. 4, 2025.

Intel, "Intel Gaudi 3 AI Accelerator," Technical Paper, Intel, 2024, 24 pages.

Xue, Leyang et al., "MoE-Infinity: Activation-Aware Expert Offloading for Efficient MoE Serving," arXiv:2401.14361, Jan. 2024, 15 pages.

European Extended Search Report for Application No. 25164046.2, mailed Jul. 15, 2025.

European Extended Search Report for Application No. 25177870.0, mailed Oct. 6, 2025.

European Extended Search Report for Application No. 25183244.0, mailed Oct. 23, 2025.

Hadidi, Ramyad et al., "Performance Implications of NoCs on 3D-Stacked Memories: Insights from the Hybrid Memory Cube," 2018 IEEE International Symposium on Performance Analysis of Systems and Software (ISPASS), Jul. 2017, 8 pages.

Horowitz, Mark, "Computing's Energy Problem (and what we can do about it)," 2014 IEEE International Solid-State Circuits Conference Digest of Technical Papers (ISSCC), Feb. 2014, 46 pages.

Hhsieh, Kevin et al. "Transparent Offloading and Mapping (TOM): Enabling Programmer-Transparent Near-Data Processing in GPU Systems," 2016 ACM/IEEE 43rd Annual International Symposium on Computer Architecture (ISCA)], Jun. 2016, pp. 204-216.

Mutlu, Onur et al., "A Modern Primer on Processing in Memory," arxiv.org, Cornell University Library, XP081831211, Dec. 2020, 42 pages.

Roy, Rishav et al., "Co-Design of Thermal Management with System Architecture and Power Management for 3D ICs," 2022 IEEE 72ND Electronic Components and Technology Conference (ECTC), IEEE, May 2022, pp. 211-220.

Zhu, Yuxiong et al., "Integrated Thermal Analysis for Processing In Die-Stacking Memory," MEMSYS '16: Proceedings of the Second International Symposium on Memory Systems, Oct. 2016, 13 pages.

European Office Action for Application No. 25164046.2, mailed Mar. 5, 2026.

Pattnaik, Ashutosh et al., "Scheduling Techniques for GPU Architectures with Processing-in-Memory Capabilities," 2016 International Conference on Parallel Architecture and Compilation Techniques (PACT), Sep. 2016, pp. 31-44.

Office Action for U.S. Appl. No. 19/038,672, mailed Mar. 26, 2026.

Office Action for U.S. Appl. No. 19/038,683, mailed Jul. 13, 2026.

* cited by examiner

SYSTEMS AND METHODS OF PROGRAMMING FOR IN-MEMORY PROCESSING

CROSS-REFERENCE TO RELATED APPLICATIONS

This application claims the benefit of U.S. Provisional Patent Application Ser. No. 63/666,105, filed Jun. 28, 2024; and Ser. No. 63/688,814, filed Aug. 29, 2024, which are incorporated by reference herein for all purposes.

TECHNICAL FIELD

The disclosure relates generally to memory systems, and more particularly to programming processes in processing in memory (PIM) systems.

BACKGROUND

The present background section is intended to provide context only, and the disclosure of any concept in this section does not constitute an admission that said concept is prior art.

Memory management is a form of resource management applied to computer memory. Some aspects of memory management provide dynamically allocation of portions of memory to programs at their request, and free the allocations for reuse when the portions of memory are no longer needed. Memory management provides important functionality for computer systems. However, improvements in memory management can be made with regards to high-performance computing and artificial intelligence (AI) systems.

SUMMARY

In various embodiments, the systems and methods described herein include systems, methods, and apparatuses for systems and methods of programming processes in processing in memory (PIM) systems. In some aspects, the techniques described herein relate to a method of programming processing-in-memory (PIM) processes, the method including: enabling, via a processor, a PIM manager for processing of PIM instructions, the PIM manager being located on a base die of a stacked memory module; enabling, via the PIM manager, a plurality of processing units of one or more memory dies of the stacked memory module for processing; compiling, via a compiler of the PIM manager, source code including the PIM instructions into machine code, the machine code being stored in a memory of a host of the stacked memory module; loading, via the compiler and a driver of the PIM manager, the machine code into an allocation of memory of the stacked memory module; and executing, via the plurality of processing units, the PIM instructions based on loading the machine code into the memory of the stacked memory module.

In some aspects, the techniques described herein relate to a method, wherein a first portion of the allocation of memory includes a first portion of the machine code, the first portion of the machine code including: a first dataset used by the plurality of processing units of the one or more memory dies in executing at least a first portion of the PIM instructions, and a second dataset used by processing units on the base die in executing at least a second portion of the PIM instructions.

In some aspects, the techniques described herein relate to a method, wherein a second portion of the allocation of memory includes a second portion of the machine code, the second portion of the machine code including: a first portion of the PIM instructions used by the plurality of processing units of the one or more memory dies in executing the first portion of the PIM instructions, and a second portion of the PIM instructions used by processing units on the base die.

In some aspects, the techniques described herein relate to a method, wherein: a third portion of the allocation of memory includes a third portion of the machine code, the third portion of the machine code including one or more load store instructions managed by the PIM manager, and the PIM manager issues an instruction from the one or more load store instructions to trigger execution of the first portion of the PIM instructions.

In some aspects, the techniques described herein relate to a method, wherein the PIM manager includes a base die processor configured to direct processing on the plurality of processing units of one or more memory dies and to orchestrate, via a shared buffer of the PIM manager, data movement between the plurality of processing units of the one or more memory dies and processing units on the base die.

In some aspects, the techniques described herein relate to a method, wherein: the PIM manager is enabled for processing based on the processor writing an activation value to an enable register included in the allocation of memory, and the PIM manager enables the plurality of processing units for processing based on the PIM manager being enabled.

In some aspects, the techniques described herein relate to a method, further including: determining execution of the PIM instructions is complete based on polling a done register included in the allocation of memory and determining a completion value of the done register indicates execution of the PIM instructions is complete, wherein the PIM manager writes the completion value to the done register based on the PIM manager determining a plurality of registers respectively associated with the plurality of processing units indicate that execution of the PIM instructions by the plurality of processing units is complete.

In some aspects, the techniques described herein relate to a method, further including writing a deactivation value to a stop register included in the allocation of memory to deactivate the PIM manager, wherein deactivating the PIM manager triggers the PIM manager to deactivate the plurality of processing units.

In some aspects, the techniques described herein relate to a method, further including writing an exception value to an exception register included in the allocation of memory to trigger an exception based on execution of the PIM instructions.

In some aspects, the techniques described herein relate to a method, wherein the one or more memory dies include one or more layers of memory dies stacked on top of the base die.

In some aspects, the techniques described herein relate to a method, wherein: the processor includes at least one of a graphical processing unit (GPU) communicatively coupled to the PIM manager or a central processing unit (CPU) of the host of the stacked memory module that is communicatively coupled to the PIM manager, and the PIM manager includes a processor and memory for PIM management.

In some aspects, the techniques described herein relate to a device including: one or more processors; and memory storing instructions that, when executed by the one or more processors, cause the device to: enable a PIM manager for processing of PIM instructions, the PIM manager being located on a base die of a stacked memory module; enable, via the PIM manager, a plurality of processing units of one or more memory dies of the stacked memory module for processing; compile, via a compiler of the PIM manager, source code including the PIM instructions into machine code, the machine code being stored in a memory of a host of the stacked memory module; load, via the compiler and a driver of the PIM manager, the machine code into an allocation of memory of the stacked memory module; and execute, via the plurality of processing units, the PIM instructions based on loading the machine code into the memory of the stacked memory module.

In some aspects, the techniques described herein relate to a device, wherein a first portion of the allocation of memory includes a first portion of the machine code, the first portion of the machine code including: a first dataset used by the plurality of processing units of the one or more memory dies in executing at least a first portion of the PIM instructions, and a second dataset used by processing units on the base die in executing at least a second portion of the PIM instructions.

In some aspects, the techniques described herein relate to a device, wherein a second portion of the allocation of memory includes a second portion of the machine code, the second portion of the machine code including: a first portion of the PIM instructions used by the plurality of processing units of the one or more memory dies in executing the first portion of the PIM instructions, and a second portion of the PIM instructions used by processing units on the base die.

In some aspects, the techniques described herein relate to a device, wherein: a third portion of the allocation of memory includes a third portion of the machine code, the third portion of the machine code including one or more load store instructions managed by the PIM manager, and the PIM manager issues an instruction from the one or more load store instructions to trigger execution of the first portion of the PIM instructions.

In some aspects, the techniques described herein relate to a device, wherein the PIM manager is configured to orchestrate, via a shared buffer of the PIM manager, data movement between the plurality of processing units of the one or more memory dies and processing units on the base die.

In some aspects, the techniques described herein relate to a device, wherein: the instructions, when executed by the one or more processors, further cause the device to determine execution of the PIM instructions is complete based on polling a done register included in the allocation of memory and determining a completion value of the done register indicates execution of the PIM instructions is complete, and the PIM manager writes the completion value to the done register based on the PIM manager determining a plurality of registers respectively associated with the plurality of processing units indicate that execution of the PIM instructions by the plurality of processing units is complete.

In some aspects, the techniques described herein relate to a non-transitory computer-readable medium storing code that includes instructions executable by a processor to: enable a PIM manager for processing of PIM instructions, the PIM manager being located on a base die of a stacked memory module; enable, via the PIM manager, a plurality of processing units of one or more memory dies of the stacked memory module for processing; compile, via a compiler of the PIM manager, source code including the PIM instructions into machine code, the machine code being stored in a memory of a host of the stacked memory module; load, via the compiler and a driver of the PIM manager, the machine code into an allocation of memory of the stacked memory module; and execute, via the plurality of processing units, the PIM instructions based on loading the machine code into the memory of the stacked memory module.

In some aspects, the techniques described herein relate to a non-transitory computer-readable medium, wherein a first portion of the allocation of memory includes a first portion of the machine code, the first portion of the machine code including: a first dataset used by the plurality of processing units of the one or more memory dies in executing at least a first portion of the PIM instructions, and a second dataset used by processing units on the base die in executing at least a second portion of the PIM instructions.

In some aspects, the techniques described herein relate to a non-transitory computer-readable medium, wherein a second portion of the allocation of memory includes a second portion of the machine code, the second portion of the machine code including: a first portion of the PIM instructions used by the plurality of processing units of the one or more memory dies in executing the first portion of the PIM instructions, and a second portion of the PIM instructions used by processing units on the base die.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

The systems and methods described herein include multiple advantages and benefits. For example, the systems and methods enable improvements to end-to-end application performance based on avoiding memory fence issues. Based on the systems and methods, time overhead due to mode change or memory fence issues is reduced or minimized (e.g., no mode change and/or no memory fence usage based on the systems and methods). Also, the systems and methods provide a simplified programming method that results in less burden being placed on end users (e.g., programmers).

BRIEF DESCRIPTION OF THE DRAWINGS

The above-mentioned aspects and other aspects of the present systems and methods will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

Figure 1:
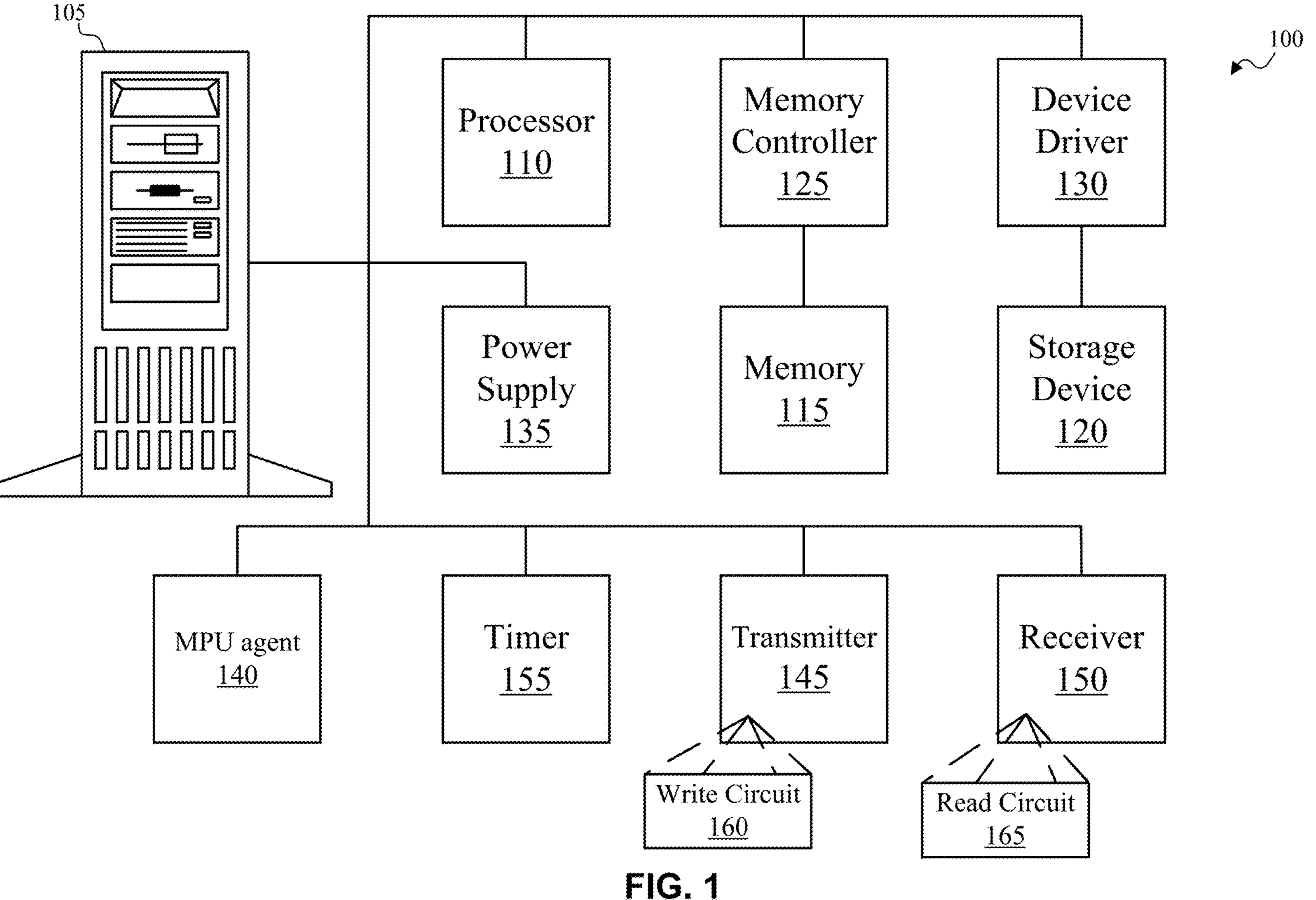
FIG. 1 illustrates an example system in accordance with one or more implementations as described herein.

While the present systems and methods are susceptible to various modifications and alternative forms, specific embodiments thereof are shown by way of example in the drawings and will herein be described. The drawings may not be to scale. It should be understood, however, that the drawings and detailed description thereto are not intended to limit the present systems and methods to the particular form disclosed, but to the contrary, the intention is to cover all modifications, equivalents, and alternatives falling within the spirit and scope of the present systems and methods as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may include conductive-bridging random access memory (CBRAM), phase-change random access memory (PRAM), ferroelectric random-access memory (FcRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of a hardware embodiment, a computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, a hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on chip (SoC), an assembly, and so forth.

The following description is presented to enable one of ordinary skill in the art to make and use the subject matter disclosed herein and to incorporate it in the context of particular applications. While the following is directed to specific examples, other and further examples may be devised without departing from the basic scope thereof.

Various modifications, as well as a variety of uses in different applications, will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed in this specification (e.g., any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

It is noted that, if used, the labels left, right, front, back, top, bottom, forward, reverse, clockwise and counterclockwise have been used for convenience purposes only and are not intended to imply any particular fixed direction. Instead, the labels are used to reflect relative locations and/or directions between various portions of an object.

Data processing may include data buffering, aligning incoming data from multiple communication lanes, forward error correction (FEC), etc. For example, data may be received by an analog front end (AFE), which can prepare the incoming data for digital processing. The digital portion of the transceivers (e.g., digital signal processor (DSP)) may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate, as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations may be embodied in a single integrated circuit, a multi-chip module, a single card, SoC, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

The systems and methods described herein may be based on and/or may include High Bandwidth Memory (HBM). HBM can include a type of memory architecture used in high-performance computing applications that requires fast data transfer speeds. HBM can use 3D stacking technology to pack more memory chips into a smaller space, reducing the distance data needs to travel between the processor and memory. This results in higher bandwidth, which allows for faster data transfer, and lower power consumption, which can help extend battery life. The systems and methods described herein may be based on and/or may include Compute Express Link (CXL) memory. CXL memory can include memory with a high-speed interface that allows for communication between devices, such as processors, memory, accelerators, storage, and other IO devices. CXL memory can be designed for high-performance data center computers and may use a Peripheral Component Interconnect Express (PCIe) physical and/or electrical interface.

The systems and methods described herein may be based on and/or may include Processing-in-Memory (PIM) HBM. PIM-HBM can include memory technology that integrates processors into memory (e.g., dynamic random-access memory (DRAM)) to improve the efficiency of artificial intelligence (AI) accelerator systems. PIM-HBM can reduce data movement by offloading some data calculation work from a central processing unit (CPU) and/or graphical processing unit (GPU) to memory. Computational offloading based on PIM-HBM can improve performance up to four times and reduce energy consumption by 70% compared to other memory solutions. PIM-HBM can be applied to a range of AI applications, including speech recognition, translation, and recommendation. PIM-HBM can stimulate growth in the use of AI applications that require continuous performance improvements, such as mobile, data centers, and high-performance computing (HPC).

The systems and methods described herein may be based on and/or may include a memory processing unit (MPU). In some cases, an MPU may include a stacked memory module (e.g., HMB module) with PIM capabilities (e.g., PIM-HBM). Thus, a given MPU may include a buffer die (e.g., base die) of a stacked memory module and one or more memory dies (e.g., DRAM dies) stacked on top of the buffer die. The buffer die may include one or more processing units (e.g., buffer die processing units). A given memory die may include one or more processing units (e.g., DRAM die processing units). The buffer die may include an MPU agent (e.g., base die processor, microcontroller, PIM manager, PIM processor, PIM processing manager, memory processor) configured to control one or more aspects of processing-in-memory on the stacked memory module. The MPU agent may be configured to control DRAM die processing units and to manage PIM processing in relation to the DRAM die processing units. The MPU agent may monitor memory transactions, including instruction fetches and data accesses from a central processing unit (CPU), graphical processing unit (GPU), processing unit of a base die (e.g., of an HBM), processing unit of a DRAM die (e.g., of an HBM), etc. In some cases, an MPU may be based on and/or may incorporate an MPU agent as described herein.

The systems and methods described herein may be based on and/or may include a control register file. A control register file can refer to a set of registers within an MPU agent that may be used to manage PIM operations, including controlling which PIM instructions are executed, where PIM instructions are executed (e.g., on DRAM die processing units and/or on base die processing units), how data is transferred between different parts of the stacked memory system (e.g., between DRAM die processing units and base die processing units, between host CPU and DRAM/base die processing units, between host CPU and GPU, between GPU and DRAM/base die processing units, or any combination thereof), and managing various PIM system settings, acting as a control center for MPU agent functionality.

The systems and methods described herein may be based on and/or may include a general register file. A general register file can refer to a collection of high-speed storage locations within an MPU agent where data (e.g., temporary data) may be stored and quickly accessed during processing, acting as a working memory for the MPU agent. The term "general" may refer to registers associated with a general register file being used for various operations and not being dedicated to a specific task, like some registers can be.

The systems and methods described herein may be based on and/or may include a memory management unit (MMU), which may be referred to as a paged memory management unit (PMMU). MMUs can include a computer hardware unit that examines memory references (e.g., memory requests, read request, write request) on a memory bus. MMUs may provide virtual-to-physical address translation, memory isolation, and/or memory protection. For example, MMUs may translate memory requests based on virtual memory addresses into physical addresses in main memory. In some cases, an MPU may include one or more MMUs.

The systems and methods may include and/or may incorporate a load-store architecture. Load and store instructions can include computer instructions that move data between registers and memory. Load/store instructions may be used for many tasks, including: manipulating data, accessing variables, sharing data between programs, optimizing system performance, etc. In a load-store architecture, instructions may be divided into two categories: memory access (load and store) and arithmetic logic unit (ALU) operations. The systems and methods may be based on load store operations of one or more processing units (e.g., graphic processing unit (GPU), tensor processing unit (TPU), neural processing unit (NPU), etc.).

The systems and methods described herein may be based on and/or may include parallel programming languages applicable to multiple types of processors (e.g., Open Computing Language (OpenCL)), enabling parallel and/or concurrent processing across HBM processing units (e.g., DRAM die processing units, base die processing units). The systems and methods described herein may be based on and/or may include software stacks for GPU computation (e.g., ROCm) that include libraries, tools, compilers, and runtimes for developing AI and HPC solutions. The software stack may be used for applications such as scientific computing, computer aided design (CAD), machine learning, generative AI, deep learning, GPU-accelerated high-performance computing (HPC), etc.

The systems and methods described herein may be based on and/or may include memory-mapped I/O (MMIO) and/or port-mapped I/O (PMIO), which may include complementary methods of performing input/output (I/O) between a processor (e.g., CPU, GPU) and peripheral devices in a computer. MMIO can include a method that allows a processor to communicate with peripheral devices using the same address space for both memory and I/O devices, making it easier to control I/O devices by using the same memory read and write instructions that are used to manipulate memory words.

The systems and methods described herein may be based on and/or may include a standalone binary. A standalone binary can include an executable file that can be launched directly, without depending on other devices or networks. For example, a standalone binary can include a pre-compiled file that can run without a compiler, interpreter, or other computer program. A standalone binary can include a type of application that can operate independently without relying on external systems or dependencies.

The systems and methods described herein may be based on and/or may include a physical layer (PHY). A PHY can include an electronic circuit that connects a network interface controller to a physical medium (e.g., copper cable, optical fiber). A PHY may be responsible for the physical layer functions of the Open Systems Interconnection (OSI) model.

The systems and methods described herein may be based on and/or may include Institute of Electrical and Electronics Engineers (IEEE) 1500. IEEE 1500 can include a standard that defines how to test the core designs of an SoC. IEEE 1500 can include a method for designing integrated circuits (ICs) with embedded, non-mergeable cores. IEEE 1500 can use a hardware architecture and core test language (CTL) to communicate between core designers and integrators.

The systems and methods described herein may be based on and/or may include buffer dies. In some cases, buffer dies may be referred to as base dies or logic dies. A buffer die may include the bottom layer of an HBM stack (e.g., HBM module). A buffer die may control the stacked memory (e.g., 3D stacked memory) of an HBM module. In some cases, a buffer die can include test logic and/or buffer circuitry. A buffer die may include one or more PHYs, Memory Built in Self-Test (MBIST) block, and/or IEEE1500. The buffer die and memory dies of an HBM module may send and receive data using through-silicon vias (TSVs).

The systems and methods described herein may be based on and/or may include a driver or device driver. A driver can include a software program of an operating system that allows the operating system to communicate with a hardware device, acting as a bridge between the software and the hardware, enabling the computer to use features of the hardware device. The driver may translate a command from the operating system into instructions the device understands.

Some systems may include relatively extensive and/or complex programming methods (e.g., for HBM PIM programming). Some systems may implement GPU kernel code for programming. Based on the provided code, a GPU may change PIM mode, write PIM instructions in correct location, and/or trigger execution of PIM instruction. Some programming methods may include a programmer manually loading PIM kernel code into PIM memory. Some programming methods may include GPU kernel code that includes mode change and load/store instructions (e.g., load instruction and/or store instruction) to control the execution of PIM instructions. The programming of some systems may include significant time overhead due to memory fence use (e.g., 30-50% overhead). A memory fence, also known as a memory barrier, can include a processor instruction that enforces an ordering constraint on memory operations. For example, a memory fence can include an instruction that requires the processor to apply an ordering constraint between memory operations that occur before and after the memory barrier instruction in the program. Also, the programming of some systems may be based on serialized GPU-PIM execution, which can decrease system performance. In such systems, either PIM processing or GPU processing can access memory at a given time. Also, a mode change that switches from GPU processing to PIM processing, or vice versa, can add additional latency.

The systems and methods described herein provide programming methods for processing in HBM memory devices with a hybrid compute architecture that includes processing units (PUs) in the buffer die and the DRAM dies. In some examples, a binary (e.g., standalone binary) containing the instructions for the PUs may be loaded at runtime into the instruction memory of a PIM device. The PUs in the buffer die (BD) may load and execute their own instructions. In some cases, an MPU agent may issue a load/store instruction for processing on DRAM die (DD) PUs. For example, the load/store instructions may trigger the execution of PIM instructions by one or more DD PUs. In some cases, PIM instructions for the DD PUs may be executed in a lock step fashion. A GPU or host CPU may start/stop the MPU agent. The MPU agent may include a memory management unit (MMU) that provides virtual-to-physical address translation, memory isolation, and/or memory protection.

The techniques described herein include logic to provide systems and methods of programming for HBM memory processing. The logic includes any combination of hardware (e.g., at least one memory, at least one processor, at least one storage drive), logical circuitry, firmware, and/or software to provide systems and methods of programming for HBM memory processing. The systems and methods described provide programming methods for processing in HBM memory. Accordingly, the systems and methods may provide programming methods based on an MPU kernel binary being loaded into memory at runtime and an MPU agent orchestrating DRAM die PU execution and data movement between DRAM die PUs and buffer die PUs.

The systems and methods enable improvements to end-to-end application performance based on avoiding memory fence issues. Based on the systems and methods, time overhead due to mode change or memory fence issues is reduced or minimized. For example, the systems and methods avoid or minimize delay from mode changes (e.g., switching from GPU having access to HBM to base die PU having access to HBM). Also, the systems and methods avoid or minimize delays from memory fence issues. Accordingly, the systems and methods provide a simplified programming method that results in less burden being placed on end users (e.g., programmers).

FIG. 1 illustrates an example system 100 in accordance with one or more implementations as described herein. In FIG. 1, machine 105, which may be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. It is noted that processor 110, along with the other components discussed below, are shown outside the machine for case of illustration: embodiments of the disclosure may include these components within the machine. While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may include volatile and/or non-volatile memory. Memory 115 may use any desired form factor: for example, Single In-Line Memory Module (SIMM), Dual In-Line Memory Module (DIMM), Non-Volatile DIMM (NVDIMM), etc. Memory 115 may be any desired combination of different memory types, and may be managed by memory controller 125. Memory 115 may be used to store data that may be termed “short-term”: that is, data not expected to be stored for extended periods of time. Examples of short-term data may include temporary files, data being used locally by applications (which may have been copied from other storage locations), and the like.

Processor 110 and memory 115 may support an operating system under which various applications may be running. These applications may issue requests (which may be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe®) protocol, a Serial Attached Small Computer System Interface (SCSI) (SAS) protocol, or a Serial AT Attachment (SATA) protocol. Storage device 120 may include any desired interface, including, for example, a Peripheral Component Interconnect Express (PCIe®) interface, or a Compute Express Link (CXL®) interface. Storage device 120 may take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device," embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices. In some cases, the term "storage unit" may encompass storage device 120 and memory 115. Machine 105 may include power supply 135. Power supply 135 may provide power to machine 105 and its components.

Machine 105 may include transmitter 145 and receiver 150. Transmitter 145 or receiver 150 may be respectively used to transmit or receive data. In some cases, transmitter 145 and/or receiver 150 may be used to communicate with memory 115 and/or storage device 120. As shown, transmitter 145 may include write circuit 160, which may be used to write data into storage, such as a register, in memory 115 and/or storage device 120. In a similar manner, receiver 150 may include read circuit 165, which may be used to read data from storage, such as a register, from memory 115 and/or storage device 120. In the illustrated example, machine 105 may include timer 155, which may be used to time one or more operations, indicate a time period, indicate a lapse of time, indicate an expiration, indicate a timeout, etc.

In one or more examples, machine 105 may be implemented with any type of apparatus. Machine 105 may be configured as (e.g., as a host of) one or more of a server such as a compute server, a storage server, storage node, a network server, a supercomputer, data center system, and/or the like, or any combination thereof. Additionally, or alternatively, machine 105 may be configured as (e.g., as a host of) one or more of a computer such as a workstation, a personal computer, a tablet, a smartphone, and/or the like, or any combination thereof. Machine 105 may be implemented with any type of apparatus that may be configured as a device including, for example, an accelerator device, a storage device, a network device, a memory expansion and/or buffer device, a central processing unit (CPU), a graphics processing unit (GPU), a neural processing unit (NPU), a tensor processing unit (TPU), optical processing units (OPU), and/or the like, or any combination thereof.

Any communication between devices including machine 105 (e.g., host, computational storage device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), Advanced extensible Interface (AXI) and/or the like, or any combination thereof, Transmission Control Protocol/Internet Protocol (TCP/IP), FibreChannel, InfiniBand, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, system 100 may include one or more additional apparatus having one or more additional communication interfaces.

Any of the functionality described herein, including any of the host functionality, device functionally, memory processing unit (MPU) agent 140 functionality, and/or the like, may be implemented with hardware, software, firmware, or any combination thereof including, for example, hardware and/or software combinational logic, sequential logic, timers, counters, registers, state machines, volatile memories such as at least one of or any combination of the following: dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), GPUs, NPUs, TPUs, OPUs, and/or the like, executing instructions stored in any type of memory. In some embodiments, one or more components of MPU agent 140 may be implemented as an SoC.

In some examples, MPU agent 140 may include any one or combination of logic (e.g., logical circuit), hardware (e.g., processing unit, memory, storage), software, firmware, and the like. In some cases, MPU agent 140 may perform one or more functions in conjunction with processor 110. In some cases, at least a portion of MPU agent 140 may be implemented in or by processor 110 and/or memory 115. The one or more logic circuits of MPU agent 140 may include any one or combination of multiplexers, registers, logic gates, arithmetic logic units (ALUs), cache, computer memory, microprocessors, processing units (CPUs, GPUs, NPUs, and/or TPUs), FPGAS, ASICs, etc., that enable MPU agent 140 to provide systems and methods of programming processes in processing in memory (PIM) systems (e.g., HBM memory processing).

In one or more examples, MPU agent 140 may provide simplified programming based on the systems and methods described herein. For example, the systems and methods may include compiling (e.g., via MPU agent 140) a kernel (e.g., MPU kernel) into a standalone binary that can be loaded into MPU instruction memory by runtime, thereby relieving a burden on programmers. In some cases, GPU kernel code may start and/or stop the MPU (e.g., enable MPU agent 140 to control PIM processing on HBM). Additionally, or alternatively, a host CPU (e.g., processor 110, a CPU of a host of an HBM module) may start/stop a given MPU. MPU agent 140 may be configured for orchestrating the execution of processing unit (PU) instructions for DRAM PUS and/or BD PUs. Based on the systems and methods, time overhead due to mode changes and/or memory fence issues is reduced or minimized (e.g., no mode change and no memory fence usage based on the systems and methods). MPU agent 140 may enable GPU-MPU concurrent execution for a GPU connected to an HBM module, PUs in DRAM dies of the HBM module, and/or PUs in a buffer die of the HBM module.

Figure 2:
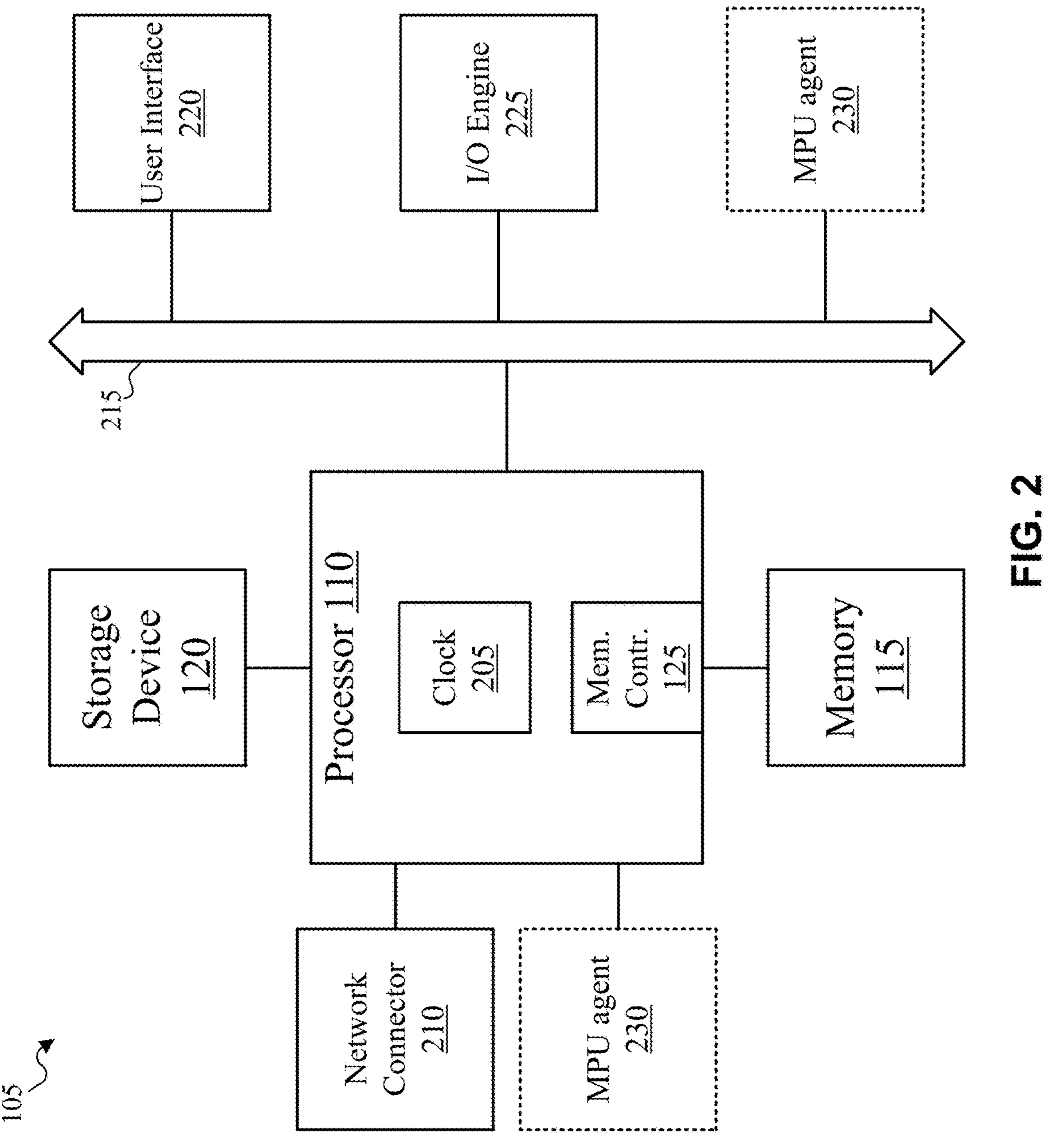
FIG. 2 illustrates details of the system of FIG. 1, according to one or more implementations as described herein.

FIG. 2 illustrates details of machine 105 of FIG. 1, according to examples described herein. In the illustrated example, machine 105 may include processor 110. Processor 110 may include one or more processors and/or one or more dies. Processor 110 may include memory controller 125 (e.g., one or more memory controllers) and clock 205 (e.g. one or more clocks), which may be used to coordinate the operations of the components of the machine. Processor 110 may be coupled to memory 115 (e.g., one or more memory chips, stacked memory, etc.), which may include random access memory (RAM), read-only memory (ROM), or other state preserving media, as examples. Processor 110 may be coupled to storage device 120 (e.g., one or more storage devices), and to network connector 210, which may be, for example, an Ethernet connector or a wireless connector. Processor 110 may be connected to bus 215 (e.g., one or more buses), to which may be attached user interface 220 (e.g., one or more user interfaces) and Input/Output (I/O) interface ports that may be managed using I/O engine 225 (e.g., one or more I/O engines), among other components. As shown, processor 110 may be coupled to MPU agent 230, which may be an example of MPU agent 140 of FIG. 1. Additionally, or alternatively, processor 110 may be connected to bus 215, to which may be attached MPU agent 230.

Figure 3:
FIG. 3 illustrates an example system flow in accordance with one or more implementations as described herein.
Figure 3:
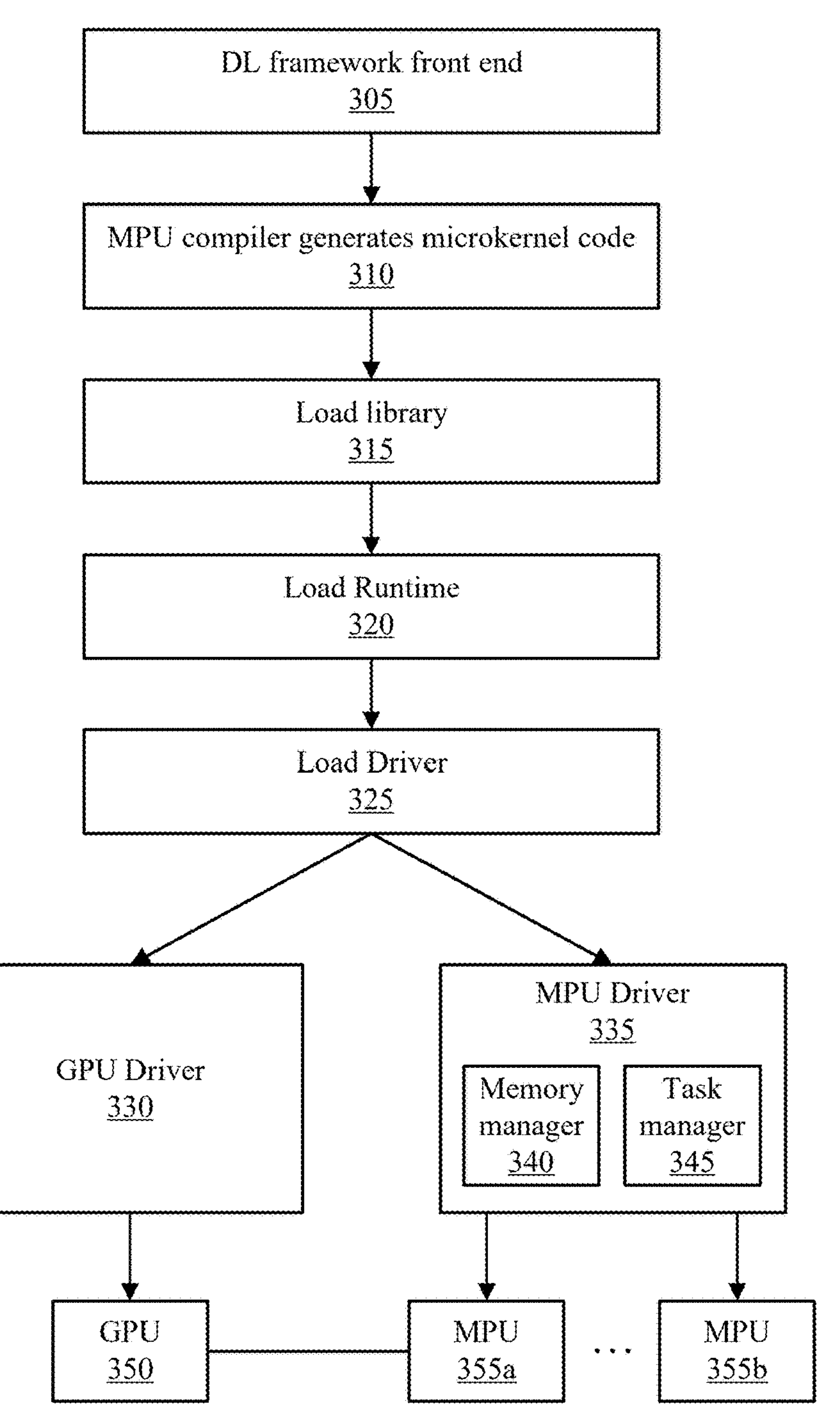

FIG. 3 illustrates an example system flow 300 in accordance with one or more implementations as described herein. In some configurations, one or more aspects of system flow 300 may be implemented by or in conjunction with MPU agent 140 of FIG. 1 and/or MPU agent 230 of FIG. 2. In some configurations, one or more aspects of system flow 300 may be implemented by or in conjunction with machine 105, components of machine 105, or any combination thereof. The depicted system flow 300 is just one implementation and one or more operations of system flow 300 may be rearranged, reordered, omitted, and/or otherwise modified such that other implementations are possible and contemplated.

In the illustrated example, at 305, system flow 300 may include providing a deep learning (DL) framework front end. Deep learning frameworks can include software packages that help design and train deep learning models. Deep learning frameworks can provide tools that allow users to train models without needing to understand the underlying algorithms. In some cases, the DL framework front end 305 may include user interface (UI) libraries or frameworks used to build a visual interface for interacting with a machine learning model. System flow 300 may include loading DL framework front end 305.

At 310, system flow 300 may include an MPU compiler (e.g., of an MPU agent such as MPU agent 140, MPU agent 230, etc.) generating microkernel code. For example, the MPU compiler may compile source code comprising the PIM instructions into microkernel code (e.g., machine code, a standalone binary). In some cases, the MPU compiler may store the microkernel code in memory of a host (e.g., CPU memory of a host of an HBM module that includes the MPU compiler).

At 315, system flow 300 may include loading one or more libraries associated with and/or enabling programming processes in processing in memory (PIM) systems. In some cases, the one or more libraries may include an application programming interface (API) (e.g., Open Computing Language). Open Computing Language (OpenCL) can enable developers to write programs that run across multiple types of processors and hardware accelerators (e.g., CPUs, GPUS, Digital signal processors (DSPs), FPGAs, etc.). In some cases, the one or more libraries may include a software stack (e.g., ROCm). The software stack can include a software stack that provides tools to program GPUs, including a collection of drivers, development tools, and APIs enabling GPU computation for high-performance computing (HPC), machine learning applications, etc. The software stack may include compilers, libraries, debuggers, and/or runtimes for efficient GPU programming across different hardware platforms.

At 320, system flow 300 may include loading a runtime. A runtime may be started by executing an executable file that contains compiled code of a program, which can trigger the underlying runtime environment to load libraries and begin executing program instructions. In some cases, loading a runtime can include loading an operating system that provides an environment for programs to execute, managing memory, processor access, and other system resources. In some cases, a runtime can refer to an environment created by a programming language (e.g., virtual machine).

At 325, system flow 300 may include loading a driver (e.g., one or more drivers). The driver may run on the runtime loaded at 320. In some cases, the drive may be loaded and actively used by the runtime whenever a hardware device associated with the driver is accessed. The driver may execute code while the hardware device is in use during a program's runtime. The driver can include a software program that allows the runtime to communicate with a hardware device, acting as a bridge between an application and the hardware. The driver may translate a command from the runtime into instructions the hardware device understands.

In some cases, the driver may include GPU driver 330 configured for a GPU of the systems and methods described herein. GPU driver 330 may include a software program that allows the runtime to communicate with GPU 350, acting as a bridge between an application (e.g., PIM processing) and GPU 350. For example, GPU driver 330 may translate a command from the runtime into instructions GPU 350 understands.

Additionally, or alternatively, the driver may include MPU driver 335 for an MPU of the systems and methods described herein. MPU driver 335 may be a component of an MPU agent (e.g., MPU agent 230). MPU driver 335 may include a software program that allows the runtime to communicate with one or more MPUs (e.g., MPU 355*a*, MPU 355*b*, etc.), acting as a bridge between an application (e.g., PIM processing) and the one or more MPUs. For example, MPU driver 335 may translate a command from the runtime into instructions the one or more MPUs understand. As shown, MPU driver 335 may include memory manager 340 and task manager 345. Memory manager 340 may manage one or more aspects of memory operation (e.g., read, write, allocate, etc.) associated with PIM processing. In some cases, task manager 345 may manage one or more tasks associated with PIM processing described herein.

Figure 4:
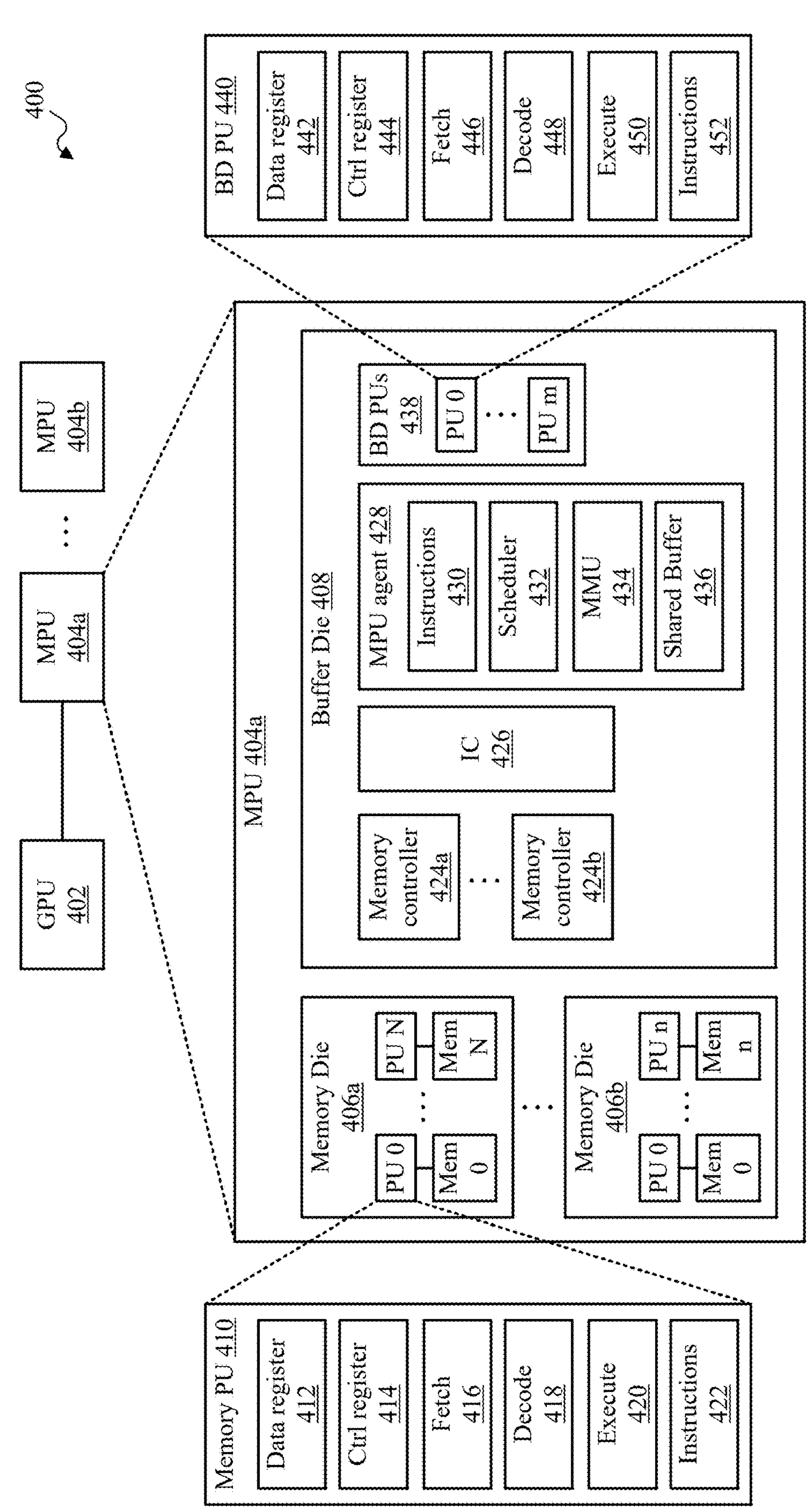
FIG. 4 illustrates an example system in accordance with one or more implementations as described herein.

FIG. 4 illustrates an example system 400 in accordance with one or more implementations as described herein. In some configurations, one or more aspects of system 400 may be implemented by or in conjunction with MPU agent 140 of FIG. 1 and/or MPU agent 230 of FIG. 2. In some configurations, one or more aspects of system 400 may be implemented by or in conjunction with machine 105, components of machine 105, or any combination thereof.

In the illustrated example, system 400 may include GPU 402 and one or more MPUs (e.g., MPU 404*a*, MPU 404*b*, etc.). As shown, MPU 404*a* may include one or more memory dies (e.g., memory dies of an HBM module such as memory die 406*a*, memory die 406*b*, etc.), and buffer die 408 (e.g., buffer die of an HBM module). As shown, a memory die (e.g., memory die 406*a*) may include one or more processing units (e.g., N PUs, where N is a positive integer such as 8, 16, 32, etc.) and one or more memory banks (e.g., N memory banks, where N is a positive integer such as 8, 16, 32, etc.).

In the illustrated example, memory die 406*a* may include memory PU 410. Memory PU 410 may include data register 412 for holding data (e.g., data for PIM processing); control register 414 for controlling aspects of PIM processing; fetch 416 for fetching data, instructions, etc., associated with PIM processing; decode 418 for decoding encoded information (e.g., encoded data, encoded instructions associated with PIM processing); execute 420 for executing PIM instructions; and instructions 422 (e.g., storage or buffer for PIM instructions).

In the illustrated example, buffer die 408 may include one or more memory controllers (e.g., memory controller 424*a*, memory controller 424*b*, etc.), integrated circuit (IC) 426, MPU agent 428, and one or more base die processing units (e.g., BD PUs 438, which may include BD PU 440). In some cases, buffer die 408 may include an interconnect that enables communication between the one or more memory dies of MPU 404*a*, buffer die 408, the one or more base die processing units of buffer die 408, and/or GPU 402. The interconnect may provide a physical interface between GPU 402, BD PUs 438, processing units of memory die 406*a*, processing units of memory die 406*b*, etc. In some cases, MPU agent 428 may include the interconnect. Thus, the interconnect may electrically connect GPU 402, BD PUs 438, processing units of memory die 406*a*, and processing units of memory die 406*b* to MPU agent 428. MPU agent 428 may be an example of MPU agent 140 and/or MPU agent 230. MPU 404*a* may incorporate or represent an HBM module with PIM capabilities.

In the illustrated example, BD PUs 438 may include BD PU 440. BD PU 440 may include data register 442 for holding data (e.g., data for PIM processing); control register 444 for controlling aspects of PIM processing; fetch 446 for fetching data, instructions, etc., associated with PIM processing; decode 448 for decoding encoded information (e.g., encoded data, encoded instructions associated with PIM processing); execute 450 for executing PIM instructions; and instructions 452 (e.g., storage or buffer for PIM instructions).

As shown, MPU agent 428 may include instructions 430 (e.g., storage or buffer for PIM instructions, load/store instructions), scheduler 432, memory management unit (MMU) 434, and shared buffer 436. In some cases, MPU agent 428 may use instructions 430 to control the execution of PIM instructions on the PUs of the one or more memory dies (e.g., memory die 406*a*, memory die 406*b*, etc.). In some examples, scheduler 432 may schedule one or more aspects of processing PIM instructions. In some cases, scheduler 432 may be configured as a memory request scheduler. For example, scheduler 432 may schedule memory requests associated with HBM memory (e.g., memory requests of GPU 402, one or more processing units of BD PUs 438, one or more processing units of memory die 406*a*, one or more processing units of memory die 406*b*, etc.).

In some examples, MMU 434 may examine memory references (e.g., memory requests, read request, write request) on a memory bus. MMU 434 may provide virtual-to-physical address translation, memory isolation, and/or memory protection. For example, MMUs may translate memory requests based on virtual memory addresses into physical addresses in main memory. Shared buffer 436 may store (e.g., temporarily store or hold) commands, memory requests, instructions, data, etc., associated with PIM processing. In some cases, a memory manager (e.g., memory manager 340) may allocate and create entries for a page table of HBM memory (e.g., of MPU 404*a*) for processing of PIM instructions.

Some systems may include programming methods that use GPU load/store instructions to drive PIM execution. Based on the systems and methods described herein, a kernel may be compiled into a standalone binary, which may be loaded into MPU instruction memory (e.g., instructions 430) by runtime, relieving a programmer's burden, avoiding programming errors (e.g., increasing programming efficiency and accuracy), and improving system performance by removing memory fence/synchronization overhead.

The systems and methods described herein reduce source code complexity. In some examples, GPU 402 and/or a CPU of a host of system 400 (e.g., processor 110) may start/stop or enable/disable MPU agent 428. For example, GPU 402 and/or the host CPU may activate MPU agent 428 for PIM processing and/or deactivate MPU agent 428 for PIM processing. MPU agent 428 may include an MPU driver (e.g., MPU driver 335). In some cases, the MPU driver may include a memory allocator, enabling MPU agent 428 to setup an MMU (e.g., MMU 434). The design of MMU 434 in MPU agent 428 may be a relatively simple design since MPU address space can be relatively limited. The PIM programming may include systems and methods for interrupting PIM process execution, memory-mapped I/O (MMIO), registers for external interrupt (e.g., from outside MPU agent 428), inter-processor interrupt (IPI), etc.

In some examples, MPU agent 428 may orchestrate, via shared buffer 436, data movement between the processing units of memory die 406*a* and BD PUs 438, between the processing units of memory die 406*b* and BD PUs 438, between the processing units of memory die 406*a* and the processing units of memory die 406*b*, and so on.

In some cases, MPU agent 428 may store data from a processing unit of buffer die 408 (e.g., BD PU 440) in shared buffer 436. In some cases, MPU agent may provide the data from the processing unit of buffer die 408 to a processing unit of memory die 406*a*, or may provide a processing unit of memory die 406*a* access to the data from the processing unit of buffer die 408. Similarly, MPU agent 428 may store data from a processing unit of memory die 406*a* in shared buffer 436. In some cases, MPU agent 428 may provide the data from the processing unit of memory die 406*a* to the processing unit of buffer die 408 or may provide the processing unit of buffer die 408 access to the data from processing unit of memory die 406*a*.

Based on MPU agent 428, the systems and methods described herein provide programming methods for processing in HBM memory devices with a hybrid compute architecture that includes processing units (PUs) on buffer die 408 (BD PUs 438) and processing units on DRAM dies (e.g., PUs of memory die 406*a*, PUs of memory die 406*b*). In some examples, a binary (e.g., standalone binary) containing the instructions for the DRAM die PUs and/or BD PUs may be loaded at runtime into instruction memory of MPU agent 428 (e.g., instructions 430). In some cases, PUs in buffer die 408 may load and execute their own instructions.

In some examples, PIM instructions for the DRAM die PUs may be executed in a lock step fashion. For example, MPU agent 428 may issue a load/store instruction (e.g., load instruction and/or store instruction from instruction 430) for processing at least a portion of PIM instructions. Based on MPU agent 428 issuing the load/store instruction, DRAM die PUs (e.g., PUs of memory die 406*a*, PUs of memory die 406*b*, etc.) may process the at least portion of PIM instructions. Thus, a load/store instruction (e.g., at least one load instruction and/or at least one store instruction) issued by MPU agent 428 may trigger execution of PIM instructions by one or more DRAM die PUs. In some cases, two or more cores (e.g., two or more DRAM die processing units) may execute the PIM same instructions at any given time.

Accordingly, the systems and methods described provide programming methods for processing in HBM memory. Accordingly, the systems and methods may provide programming methods based on an MPU kernel binary being loaded into memory at runtime and an MPU agent orchestrating DRAM die PU execution and data movement between DRAM die PUs and buffer die PUs.

Figure 5:
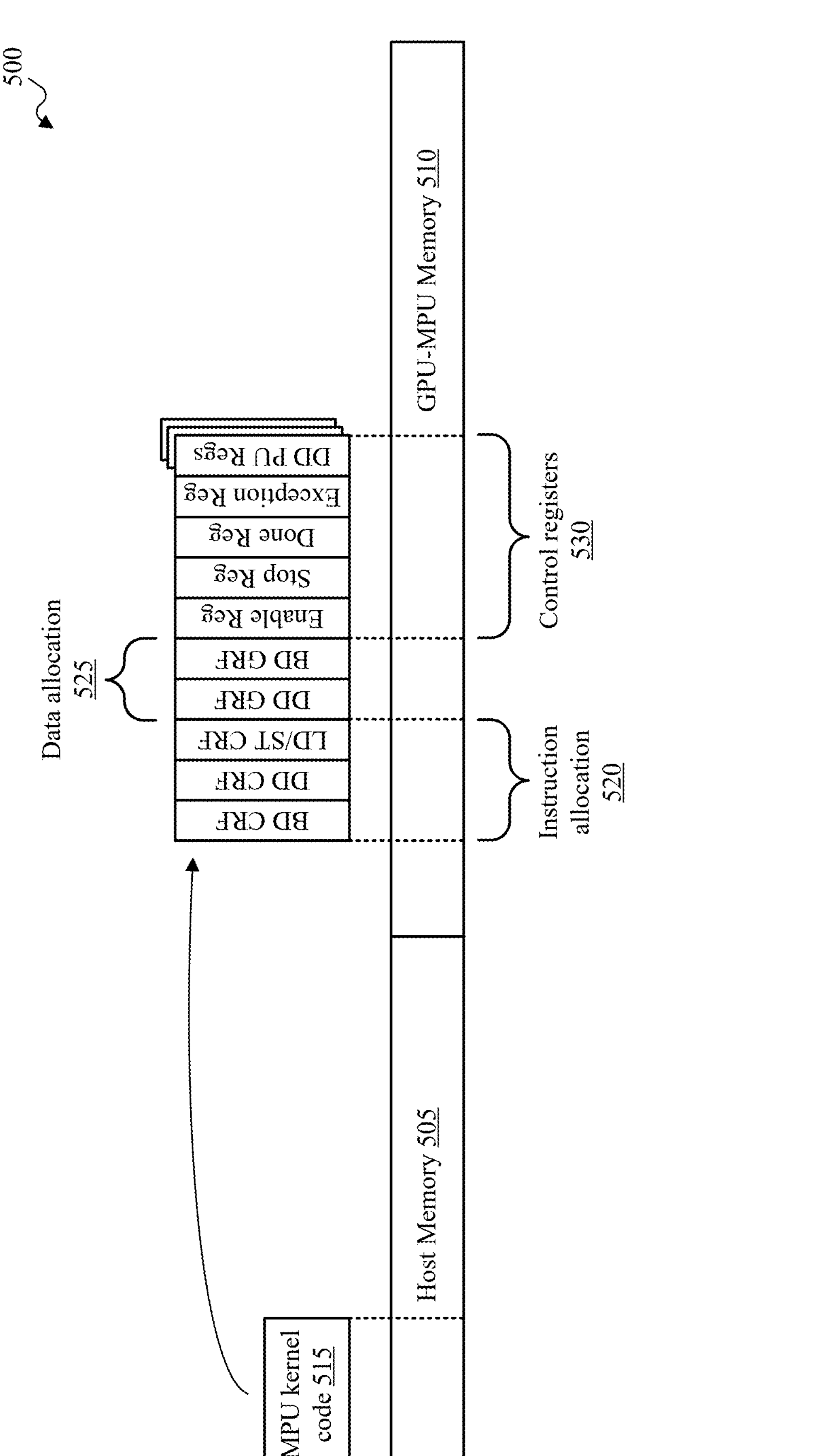
FIG. 5 illustrates an example memory system in accordance with one or more implementations as described herein.

FIG. 5 illustrates an example memory system 500 in accordance with one or more implementations as described herein. In some configurations, one or more aspects of memory system 500 may be implemented by or in conjunction with MPU agent 140 of FIG. 1 and/or MPU agent 230 of FIG. 2. In some configurations, one or more aspects of memory system 500 may be implemented by or in conjunction with machine 105, components of machine 105, or any combination thereof.

In the illustrated example, memory system 500 may include host memory 505 and GPU-MPU memory 510. Host memory 505 may include memory of a host of a GPU and/or MPU. For example, a host of a GPU-MPU system may include at least one GPU that is connected to one or more MPUs. A given MPU may include a stacked memory module (e.g., HBM module) with processing-in-memory (PIM) capabilities via processing on the stacked memory module (e.g., DRAM die processing units, base die processing units).

In the illustrated example, memory system 500 may include MPU kernel code 515. In some examples, the text of PIM instructions (e.g., source code) may be compiled (e.g., by MPU agent 428) into a kernel (e.g., MPU kernel code 515). As shown, MPU kernel code 515 may be stored in host memory 505 (e.g., memory of a host of an HBM module, CPU memory of a host). MPU kernel code 515 may be a standalone binary that can be loaded into MPU instruction memory (e.g., GPU-MPU memory 510) by runtime, thereby relieving the burden on programmers of loading instructions into MPU instruction memory.

In the illustrated example, MPU kernel code 515 may be loaded into GPU-MPU memory 510 (e.g., MPU instruction memory, memory of an HBM module, memory of MPU 404*a*, instructions 430). In some cases, MPU kernel code 515 may be loaded into GPU-MPU memory 510 via MPU agent 428 (e.g., via a compiler of MPU agent 428 and/or a driver of MPU agent 428 such as MPU driver 335). As shown, GPU-MPU memory 510 may include instruction allocation 520, data allocation 525, and control registers 530. In some cases, the instructions of MPU kernel code 515 may be loaded into GPU-MPU memory 510 within instruction allocation 520. In some examples, a task manager (e.g., task manager 345), in conjunction with an MPU agent (e.g., MPU agent 428), may copy MPU kernel code 515 to GPU-MPU memory 510. In some cases, the MPU agent may fetch PIM instructions from a load/store command register file (LD/ST CRF) of instruction allocation 520. The MPU agent may be configured to read an instruction and send the instruction to the correct DRAM die processing unit. In some cases, an MPU driver (e.g., MPU driver 335) may place the right information into the correct memory location so that the MPU agent reads the correct instructions at the correct memory location. In some cases, a memory manager of an MPU agent (e.g., memory manager 340) may allocate and create entries for a page table associated with the allocation of instruction allocation 520, data allocation 525, and/or control registers 530.

In the illustrated example, instruction allocation 520 includes at least one buffer die (BD) command register file (CRF), at least one DRAM die (DD) CRF, and at least one load/store (LD/ST) CRF. Data allocation 525 may include at least one DD general-purpose register file (GRF) and at least one BD GRF. In some cases, the CRFs of instruction allocation 520 may include instructions for PIM processing (e.g., PIM instructions) and GRFs of data allocation 525 may include data for PIM processing (e.g., PIM data). As shown, control registers 530 may include at least one enable register, at least one stop register, at least one done register, at least one exception register, and at least one DD PU register. In some cases, each PU of a given DRAM die may be associated with a DD PU register. When a given PU completes assigned PIM processing, the given PU may indicate completion of the PIM processing in its assigned DD PU register. When the MPU agent (e.g., MPU agent 428) determines that all the assigned DD PUs have completed processing (e.g., via their respective DD PU registers), the MPU agent determines that a batch of PIM processing is complete, which may be indicated in the done register.

In some examples, a GPU (e.g., GPU 402) and/or host CPU may control the MPU agent via control registers 530. The GPU/CPU may use the enable register of control register 530 to start or enable the MPU agent for PIM processing (e.g., by setting bit of enable register to binary 1 or to binary 0). The MPU agent may monitor the enable register, and once enabled, the MPU agent may issue a signal to start PUs of a given HBM module (e.g., DD PUs and/or BD PUs of MPU 404*a*).

In some cases, an MPU agent (e.g., MPU agent 428) may send a signal to a memory die PU that activates the memory die PU. In some cases, the MPU agent may write an activation value to a register associated with the memory die PU. For example, the MPU agent may write an activation value (e.g., binary 1 activates; binary 0 deactivates; or vice versa) to a first register to activate a first memory die PU, write an activation value to a second register to activate a second memory die PU, and so on. In some cases, the MPU agent may communicate a signal (e.g., respective signals to each memory die processing unit) that enables processing on each memory die processing unit.

In some examples, the MPU agent may write a value to the done register of control register 530 that indicates execution of the PIM instructions is complete based on the MPU agent determining a plurality of registers respectively associated with a plurality of processing units of the memory die indicates that execution of the PIM instructions by the plurality of processing units is complete In some cases, each processing unit of a memory die may be associated with one of the DD PU registers (e.g., a first processing unit associated with a first DD PU register, a second processing unit associated with a second DD PU register, etc.). The MPU agent may determine that execution of the PIM instructions is complete based on checking or polling each status register periodically. When the MPU agent determines that all of the status registers indicate each processing unit has completed execution, the MPU agent may write a value to the done register that indicates execution of the PIM instructions is complete. For example, the MPU agent may write a value to the done register to indicate execution has completed (e.g., binary 1 indicates execution is complete; binary 0 indicates execution is ongoing; or vice versa). A processor (e.g., host CPU, GPU) monitoring execution of the PIM instruction may poll the done register (e.g., check the done register periodically) to determine that execution of the PIM instruction is complete.

In some cases, a processor (e.g., host CPU, GPU) may write a deactivation value to the stop register of control register 530 to deactivate the MPU agent, which may stop or pause PIM processing. For example, the GPU/host processor may write a value to the stop register to stop processing by the MPU agent (e.g., binary 1 indicates processing is disabled; binary 0 indicates processing is enabled or may continue; or vice versa). In some cases, the GPU/host processor may deactivate the MPU agent based on a determination that execution of the PIM instructions is complete. Deactivating the MPU agent (e.g., and the multiple DRAM die processing units) may save power and increase system efficiency. In some cases, the MPU agent may poll the stop register (e.g., check the done register periodically) to determine whether processing is allowed to continue. When the MPU agent determines that the stop register indicates to stop processing, the MPU agent may deactivate the set of memory die processing units executing the PIM instructions. In some cases, the MPU agent may write a deactivation value to registers respectively associated with the set of memory die processing units. For example, the MPU agent may write a deactivation value (e.g., binary 1 activates; binary 0 deactivates; or vice versa) to a first register to deactivate a first memory die PU, write a deactivation value to a second register to deactivate a second memory die PU, and so on. In some cases, the MPU agent may communicate a signal (e.g., respective signals to each memory die processing unit) that disables processing on each memory die processing unit.

In some cases, the MPU agent may determine or detect an exception based on execution of the PIM instructions (e.g., divide by zero, etc.). In response to the exception, the MPU agent may write a value to an exception register of control register 530 (e.g., binary 1 indicates exception has occurred; binary 0 indicates no exception; or vice versa). In some cases, the MPU agent, GPU, host processor, or a runtime may handle the exception. Once the exception is handled, execution of the PIM instructions may continue.

In some examples, the MPU agent may issue a load/store instruction (e.g., from LD/ST CRF of instruction allocation 520) for processing PIM instructions. Based on the MPU agent issuing the load/store instruction (e.g., load instruction and/or store instruction), DRAM die PUs may process the PIM instructions. Thus, a load/store instruction issued by the MPU agent may trigger execution of PIM instructions by one or more DRAM die PUs. In some cases, one load/store instruction (e.g., load instruction and/or store instruction) may trigger the execution of a batch of DD PU instructions. In some cases, DD PUs may continue executing PIM instructions until meeting an instruction requiring data from a memory bank of a DRAM die.

Figure 6:
FIG. 6 depicts a flow diagram illustrating an example method associated with the disclosed systems, in accordance with example implementations described herein.
Figure 6:
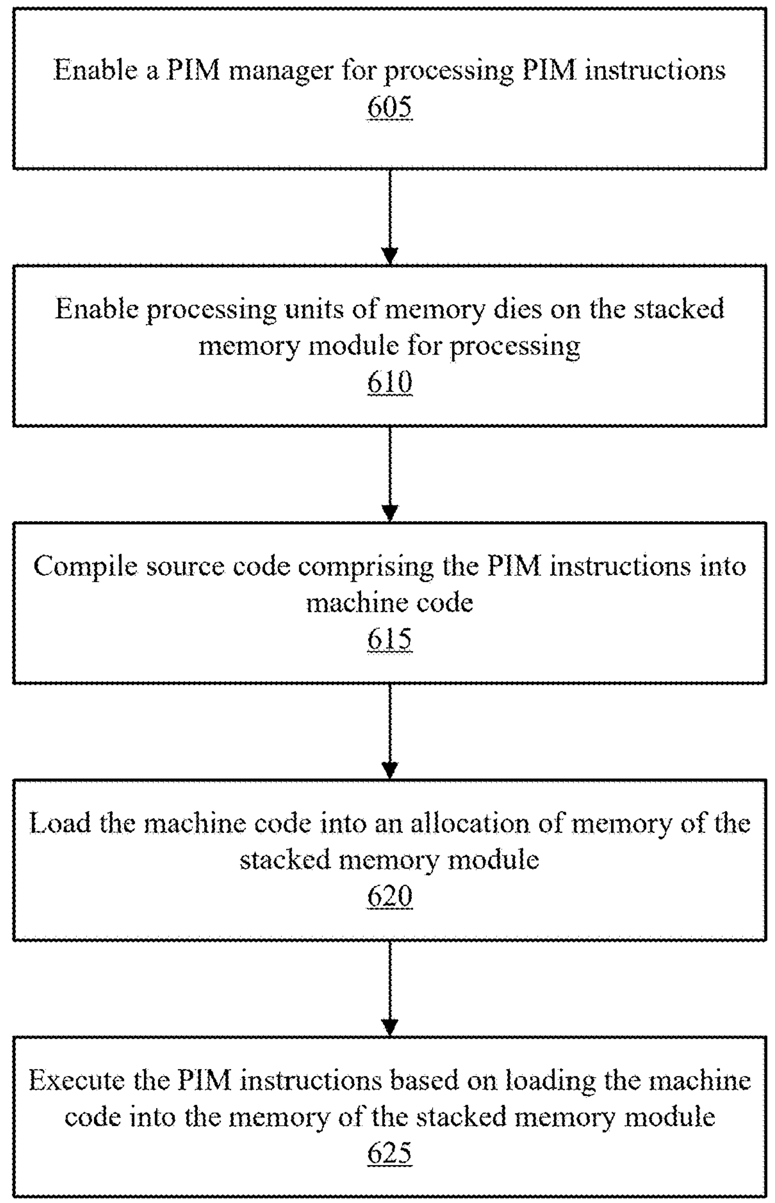

FIG. 6 depicts a flow diagram illustrating an example method 600 associated with the disclosed systems, in accordance with example implementations described herein. In some configurations, one or more aspects of method 600 may be implemented by or in conjunction with MPU agent 140 of FIG. 1 and/or MPU agent 230 of FIG. 2. In some configurations, one or more aspects of method 600 may be implemented by or in conjunction with machine 105, components of machine 105, or any combination thereof. The depicted method 600 is just one implementation and one or more operations of method 600 may be rearranged, reordered, omitted, and/or otherwise modified such that other implementations are possible and contemplated.

At 605, method 600 may include enabling a processing-in-memory (PIM) manager for processing PIM instructions. For example, a processor may enable a PIM manager for processing (e.g., for managing processing) of PIM instructions. The PIM manager may be located on a base die of a stacked memory module (e.g., HBM module) and may control, manage, and/or direct one or more aspects of processing performed by DRAM die processing units (DD PUs) on memory dies of the stacked memory module. For example, the PIM manager may enable or activate DD PUs for processing. In some cases, the PIM manager may initiate or trigger processing, pause processing, raise an exception to processing, and/or stop processing on the DD PUs. The PIM manager may indicate completion of processing (e.g., via a register). It is noted that the processor that enables the PIM manager for processing PIM instructions may include a GPU connected to the stacked memory module and/or a CPU of a host of the stacked memory module.

At 610, method 600 may include enabling the processing units of the memory dies on the stacked memory module for processing. For example, method 600 may include the PIM manager enabling a plurality of processing units of one or more memory dies of the stacked memory module for processing.

At 615, method 600 may include compiling source code comprising the PIM instructions into machine code. For example, method 600 may include a compiler of the PIM manager that compiles source code comprising the PIM instructions into machine code. The machine code may be stored in a memory of a host of the stacked memory module.

At 620, method 600 may include loading the machine code into an allocation of memory of the stacked memory module (e.g., copying the machine code from the memory of the host to memory of the stacked memory module). For example, method 600 may include the compiler (e.g., in conjunction with a driver of the PIM manager) loading the machine code into an allocation of memory of the stacked memory module.

At 625, method 600 may include executing the PIM instructions based on loading the machine code into the memory of the stacked memory module. For example, method 600 may include the plurality of processing units (e.g., under direction of the PIM manager) executing the PIM instructions based on loading the machine code into the memory of the stacked memory module.

Figure 7:
FIG. 7 depicts a flow diagram illustrating an example method associated with the disclosed systems, in accordance with example implementations described herein.
Figure 7:
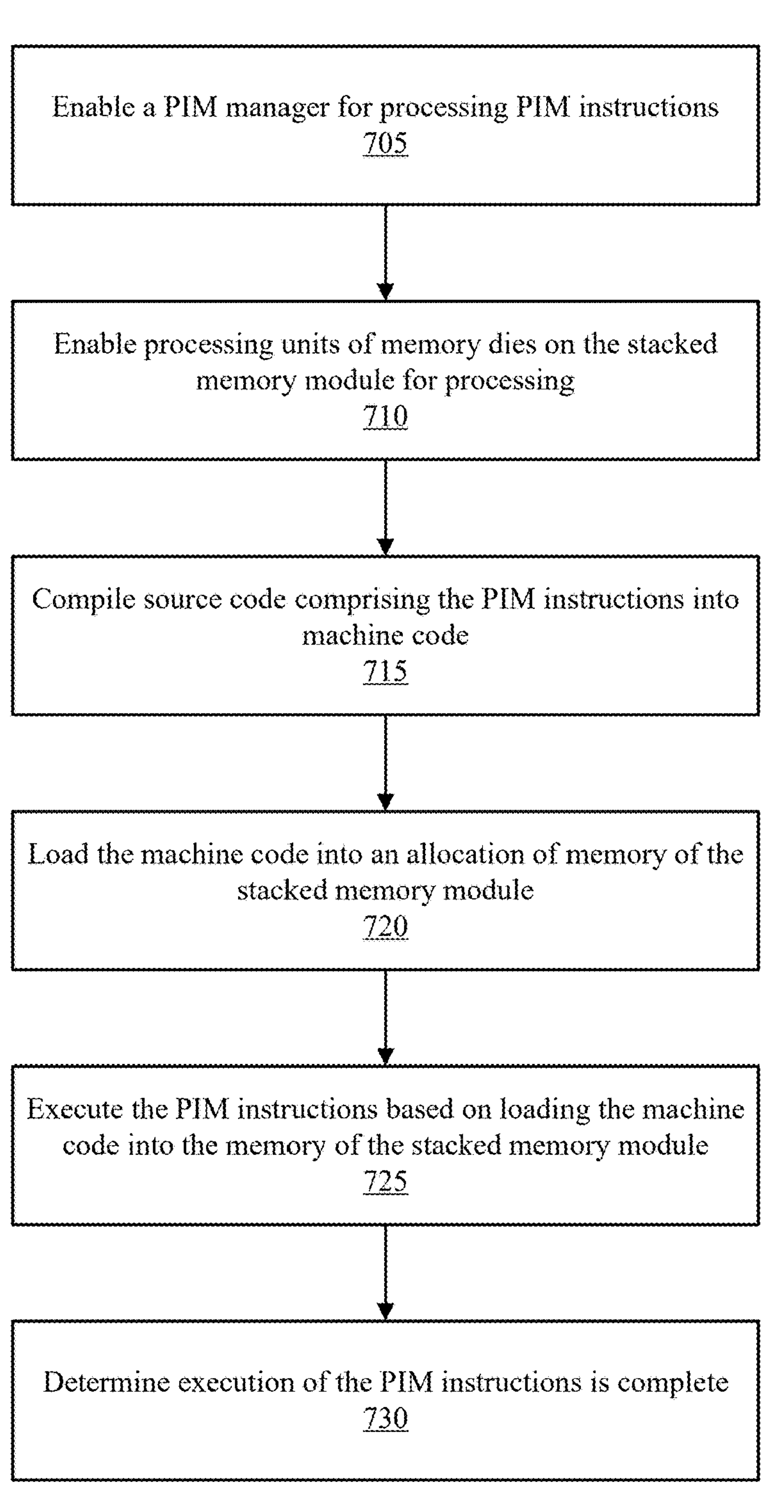

FIG. 7 depicts a flow diagram illustrating an example method 700 associated with the disclosed systems, in accordance with example implementations described herein. In some configurations, one or more aspects of method 700 may be implemented by or in conjunction with MPU agent 140 of FIG. 1 and/or MPU agent 230 of FIG. 2. In some configurations, one or more aspects of method 700 may be implemented by or in conjunction with machine 105, components of machine 105, or any combination thereof. The depicted method 700 is just one implementation and one or more operations of method 700 may be rearranged, reordered, omitted, and/or otherwise modified such that other implementations are possible and contemplated.

At 705, method 700 may include enabling a processing-in-memory (PIM) manager for processing PIM instructions. For example, a processor may enable a PIM manager for processing (e.g., for managing processing) of PIM instructions. The PIM manager may be located on a base die of a stacked memory module (e.g., HBM module) and may control, manage, and/or direct one or more aspects of processing performed by DRAM die processing units (DD PUs) on memory dies of the stacked memory module. For example, the PIM manager may enable or activate DD PUs for processing. In some cases, the PIM manager may initiate or trigger processing, pause processing, raise an exception to processing, and/or stop processing on the DD PUs. The PIM manager may indicate completion of processing (e.g., via a register). It is noted that the processor that enables the PIM manager for processing PIM instructions may include a GPU connected to the stacked memory module and/or a CPU of a host of the stacked memory module.

At 710, method 700 may include enabling the processing units of the memory dies on the stacked memory module for processing. For example, method 700 may include the PIM manager enabling a plurality of processing units of one or more memory dies of the stacked memory module for processing.

At 715, method 700 may include compiling source code comprising the PIM instructions into machine code. For example, method 700 may include a compiler of the PIM manager that compiles source code comprising the PIM instructions into machine code. The machine code may be stored in a memory of a host of the stacked memory module.

At 720, method 700 may include loading the machine code into an allocation of memory of the stacked memory module (e.g., copying the machine code from the memory of the host to memory of the stacked memory module). For example, method 700 may include the compiler (e.g., in conjunction with a driver of the PIM manager) loading the machine code into an allocation of memory of the stacked memory module.

At 725, method 700 may include executing the PIM instructions based on loading the machine code into the memory of the stacked memory module. For example, method 700 may include the plurality of processing units (e.g., under direction of the PIM manager) executing the PIM instructions based on loading the machine code into the memory of the stacked memory module.

At 730, method 700 may include determining execution of the PIM instructions is complete. For example, method 700 may include determining execution of the PIM instructions is complete based on the GPU and/or host CPU polling a done register. The done register may be included in shared memory that is accessible by the PIM manager, GPU, host CPU, etc. In some cases, the done register may be included in the allocation of memory. In some cases, the GPU and/or host may determine PIM execution is complete based on a completion value of the done register (e.g., binary 1 indicates execution is complete; binary 0 indicates completion of execution is pending; or vice versa). In some cases, the PIM manager may write the completion value to the done register based on the PIM manager determining a plurality of registers respectively associated with DRAM die processing units indicating that execution of the PIM instructions by the DRAM die processing units is complete (e.g., a first register written to by a first DRAM die processing unit indicates the first DRAM die processing unit has completed its portion of execution, a second register written to by a second DRAM die processing unit indicates the second DRAM die processing unit has completed its portion of execution, and so on).

In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein. Additionally, or alternatively, the sequential and/or temporal order of the operations may be varied.

Certain embodiments may be implemented in one or a combination of hardware, firmware, and software. Other embodiments may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word “exemplary” is used herein to mean “serving as an example, instance, or illustration.” Any embodiment described herein as “exemplary” is not necessarily to be construed as preferred or advantageous over other embodiments. The terms “computing device,” “user device,” “communication station,” “station,” “handheld device,” “mobile device,” “wireless device” and “user equipment” (UE) as used herein refers to a wired and/or wireless communication device such as a switch, router, network interface controller, cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be wireless, wired, mobile, and/or stationary.

As used within this document, the term “communicate” is intended to include transmitting, or receiving, or both transmitting and receiving. Similarly, the bidirectional exchange of data between two devices (both devices transmit and receive during the exchange) may be described as ‘communicating’, when only the functionality of one of those devices is being claimed. The term “communicating” as used herein with respect to wired and/or wireless communication signals includes transmitting the wired and/or wireless communication signals and/or receiving the wired and/or wireless communication signals. For example, a communication unit, which is capable of communicating wired and/or wireless communication signals, may include a wired/wireless transmitter to transmit communication signals to at least one other communication unit, and/or a wired/wireless communication receiver to receive the communication signal from at least one other communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples as set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method of programming processing-in-memory (PIM) processes, the method comprising:

enabling, via a processor, a PIM manager for processing of PIM instructions, the PIM manager being located on a base die of a stacked memory module;

enabling, via the PIM manager, a plurality of processing units of one or more memory dies of the stacked memory module for processing;

compiling, via a compiler of the PIM manager, source code comprising the PIM instructions into machine code, the machine code being stored in a memory of a host of the stacked memory module;

loading, via the compiler and a driver of the PIM manager, the machine code into an allocation of memory of the stacked memory module; and executing, via the plurality of processing units, the PIM instructions based on loading the machine code into the memory of the stacked memory module.

2. The method of claim 1, wherein a first portion of the allocation of memory comprises a first portion of the machine code, the first portion of the machine code comprising:

a first dataset used by the plurality of processing units of the one or more memory dies in executing at least a first portion of the PIM instructions, and a second dataset used by processing units on the base die in executing at least a second portion of the PIM instructions.

3. The method of claim 1, wherein a second portion of the allocation of memory comprises a second portion of the machine code, the second portion of the machine code comprising:

a first portion of the PIM instructions used by the plurality of processing units of the one or more memory dies in executing the first portion of the PIM instructions, and a second portion of the PIM instructions used by processing units on the base die.

4. The method of claim 3, wherein:

a third portion of the allocation of memory comprises a third portion of the machine code, the third portion of the machine code comprising one or more load store instructions managed by the PIM manager, and the PIM manager issues an instruction from the one or more load store instructions to trigger execution of the first portion of the PIM instructions.

5. The method of claim 1, wherein the PIM manager comprises a base die processor configured to direct processing on the plurality of processing units of one or more memory dies and to orchestrate, via a shared buffer of the PIM manager, data movement between the plurality of processing units of the one or more memory dies and processing units on the base die.

6. The method of claim 1, wherein:

the PIM manager is enabled for processing based on the processor writing an activation value to an enable register included in the allocation of memory, and the PIM manager enables the plurality of processing units for processing based on the PIM manager being enabled.

7. The method of claim 1, further comprising:

determining execution of the PIM instructions is complete based on polling a done register included in the allocation of memory and determining a completion value of the done register indicates execution of the PIM instructions is complete, wherein the PIM manager writes the completion value to the done register based on the PIM manager determining a plurality of registers respectively associated with the plurality of processing units indicate that execution of the PIM instructions by the plurality of processing units is complete.

8. The method of claim 1, further comprising writing a deactivation value to a stop register included in the allocation of memory to deactivate the PIM manager, wherein deactivating the PIM manager triggers the PIM manager to deactivate the plurality of processing units.

9. The method of claim 1, further comprising writing an exception value to an exception register included in the allocation of memory to trigger an exception based on execution of the PIM instructions.

10. The method of claim 1, wherein the one or more memory dies comprise one or more layers of memory dies stacked on top of the base die.

11. The method of claim 1, wherein:

the processor comprises at least one of a graphical processing unit (GPU) communicatively coupled to the PIM manager or a central processing unit (CPU) of the host of the stacked memory module that is communicatively coupled to the PIM manager, and the PIM manager comprises a processor and memory for PIM management.

12. A device comprising:

one or more processors; and memory storing instructions that, when executed by the one or more processors, cause the device to:

enable a PIM manager for processing of PIM instructions, the PIM manager being located on a base die of a stacked memory module;

enable, via the PIM manager, a plurality of processing units of one or more memory dies of the stacked memory module for processing;

compile, via a compiler of the PIM manager, source code comprising the PIM instructions into machine code, the machine code being stored in a memory of a host of the stacked memory module;

load, via the compiler and a driver of the PIM manager, the machine code into an allocation of memory of the stacked memory module; and execute, via the plurality of processing units, the PIM instructions based on loading the machine code into the memory of the stacked memory module.

13. The device of claim 12, wherein a first portion of the allocation of memory comprises a first portion of the machine code, the first portion of the machine code comprising:

a first dataset used by the plurality of processing units of the one or more memory dies in executing at least a first portion of the PIM instructions, and a second dataset used by processing units on the base die in executing at least a second portion of the PIM instructions.

14. The device of claim 12, wherein a second portion of the allocation of memory comprises a second portion of the machine code, the second portion of the machine code comprising:

a first portion of the PIM instructions used by the plurality of processing units of the one or more memory dies in executing the first portion of the PIM instructions, and a second portion of the PIM instructions used by processing units on the base die.

15. The device of claim 14, wherein:

a third portion of the allocation of memory comprises a third portion of the machine code, the third portion of the machine code comprising one or more load store instructions managed by the PIM manager, and the PIM manager issues an instruction from the one or more load store instructions to trigger execution of the first portion of the PIM instructions.

16. The device of claim 12, wherein the PIM manager is configured to orchestrate, via a shared buffer of the PIM manager, data movement between the plurality of processing units of the one or more memory dies and processing units on the base die.

17. The device of claim 12, wherein:

the instructions, when executed by the one or more processors, further cause the device to determine execution of the PIM instructions is complete based on polling a done register included in the allocation of memory and determining a completion value of the done register indicates execution of the PIM instructions is complete, and the PIM manager writes the completion value to the done register based on the PIM manager determining a plurality of registers respectively associated with the plurality of processing units indicate that execution of the PIM instructions by the plurality of processing units is complete.

18. A non-transitory computer-readable medium storing code that comprises instructions executable by a processor to:

enable a PIM manager for processing of PIM instructions, the PIM manager being located on a base die of a stacked memory module;

enable, via the PIM manager, a plurality of processing units of one or more memory dies of the stacked memory module for processing;

compile, via a compiler of the PIM manager, source code comprising the PIM instructions into machine code, the machine code being stored in a memory of a host of the stacked memory module;

load, via the compiler and a driver of the PIM manager, the machine code into an allocation of memory of the stacked memory module; and execute, via the plurality of processing units, the PIM instructions based on loading the machine code into the memory of the stacked memory module.

19. The non-transitory computer-readable medium of claim 18, wherein a first portion of the allocation of memory comprises a first portion of the machine code, the first portion of the machine code comprising:

a first dataset used by the plurality of processing units of the one or more memory dies in executing at least a first portion of the PIM instructions, and a second dataset used by processing units on the base die in executing at least a second portion of the PIM instructions.

20. The non-transitory computer-readable medium of claim 18, wherein a second portion of the allocation of memory comprises a second portion of the machine code, the second portion of the machine code comprising:

a first portion of the PIM instructions used by the plurality of processing units of the one or more memory dies in executing the first portion of the PIM instructions, and a second portion of the PIM instructions used by processing units on the base die.

* * * * *